Patented July 27, 1943

2,325,062

UNITED STATES PATENT OFFICE 2,325,062

ACID-REACTING DERIVATIVES OF ALCOHOL AMINE CONDENSATION PRODUCTS

Wolf Kritchevsky, Chicago, Ill., assignor, by mesne assignments, to Ninol Development Company, Chicago, Ill., a copartnership No Drawing. Application August 12, 1939, Serial No. 289,789

18 Claims. (Cl. 260—404)

My invention relates to a new class of chemical compounds and method of producing the same.

It has already been proposed to prepare condensation products of alcohol amines, particularly alkylolamines, with higher organic acid substances, for example, higher fatty acids, wherein the molal ratio of alcohol amine to higher organic acid is approximately one to one or not substantially more than one to one, as well as less than one to one. Such compounds are disclosed in, among other publications, British Patent No. 337,737.

In my prior patent, No. 2,089,212, issued August 10, 1937, I have disclosed new chemical compounds having very valuable properties as emulsifying agents, as assistants in the textile and related industries, and for various other purposes. In general, said chemical compounds are condensation products of alcohol amines or alkylolamines and higher molecular weight mono-carboxylic acids wherein the molal ratio of the alcohol amine to the acid is not substantially less than two to one. More particularly, the acids employed in said condensation products include the higher molecular weight aliphatic acids and, of this group, the higher fatty acids, especially those having between twelve and eighteen carbon atoms, have been found especially useful.

In my prior Patent No. 2,094,609, issued October 5, 1937, I have disclosed new chemical compounds having valuable technical properties which chemical compounds, in general, comprise condensation products of alcohol amines or alkylolamines, amines, and higher carboxylic acids, particularly higher fatty acids, the molal ratio of said reacting constituents being one mol of acid, at least one mol of alcohol amine and at least one mol of amine.

In my prior Patent No. 2,094,608, issued October 5, 1937, I have disclosed new chemical compounds having valuable technical properties which chemical compounds, in general, comprise condensation products of alcohol amines or alkylolamines and polycarboxylic acids wherein there is present not substantially less than two mols of alcohol amine for each carboxyl group of the polycarboxylic acid.

In each of the patents referred to hereinabove, and, as described therein, instead of the free higher organic acids, derivatives thereof, namely, organic acid substances, may be employed such as esters, anhydrides or halides.

The condensation products described in the patents referred to hereinabove give, in general, an alkaline reaction when dissolved or disposed in aqueous media, many of the products having a pH between 8.0 and 10.0, and they have the property of forming salts with acids or acidic substances such as acetic acid, hydrochloric acid, lactic acid and the like.

I have found that, for many purposes, it is important to provide products of the character indicated which have an acid reaction or, in other words, a pH below 7, in some cases, as low as 3 or 4 or even still lower. To this end, I have discovered that if the condensation products described above are reacted with certain halogen-containing derivatives, as set out hereinbelow, the resulting novel products not only have an acid reaction but, in addition, possess properties rendering them unusually satisfactory for many purposes.

In general, my novel products are prepared by reacting condensation products such as those described in my prior patents referred to hereinabove with organic compounds of the type of halogeno-carboxylic acids and halogeno-acyl halides. Among these latter compounds which may be reacted with the condensation products described in my previously mentioned patents are, for example, mono-chloracetic acid, di-chloracetic acid, tri-chloracetic acid, acetyl chloride, propionyl chloride, mono-chloracetyl chloride, di-chloracetyl chloride, tri-chloracetyl chloride, corresponding derivatives of propionic acid, butyric acid and other aliphatic acids of lower molecular weight, the halides corresponding to the chloride derivatives mentioned, namely, the brom and iodo derivatives such as mono-bromacetyl bromide, mono-bromacetic acid, and the like, mono-chlor succinic acid, di-chlor succinic acid, mono-chlor succinyl chloride, and di-chlor succinyl chloride; aromatic derivatives such as mono-chlor benzoyl chloride, di- and poly-chlor benzoyl chloride, benzoyl chloride, nitro benzoyl chloride, sulphonated and other derivatives of benzoyl chloride, the corresponding halogen derivatives of naphthoic acid and other polynuclear acids, including the corresponding brom and iodo derivatives. The halogeno-carboxylic acids as, for example, monochloracetic acid, may be reacted with those condensation products such as are disclosed in my above-mentioned patents, namely, Nos. 2,089,212; 2,094,609 and 2,094,608, in other words, generally speaking, where the molal ratio of the alcohol amine to the carboxylic acid (where the carboxylic acid is monocarboxylic) present in the condensation product is not substantially less than two to one. Where the condensation product of alkylolamine and carboxylic acid is of the order of one to one as, for example, in the case of one mol of monoethanolamine and one mol of stearic acid, reaction with halogeno-carboxylic acids does not appear to take place, the reaction mixture separating into two layers. However, the reaction in accordance with my invention does take place with halogeno-acyl halides, such as, for example, chloracetyl chloride, independently of the molal ratio of the alcohol amines to the carboxylic acids present in the condensation products. The following examples are illustrative of my invention but it is to be understood that the invention is not to be limited except as defined in the appended claims.

Example I 230 grams of a condensation product prepared by heating two mols of diethanolamine with one mol of stearic acid at a temperature between 150 degrees C. and 200 degrees C. for two to three hours were melted and 47 grams of mono chloracetic acid were added thereto gradually, the mass being heated to maintain it in a liquid condition but the heating not exceeding approximately 100 degrees C. The mass was maintained on a water bath for approximately two hours. The resulting product had a pH of 3.2 and had excellent technical properties.

Example II 75 grams of a condensation product of two mols of diethanolamine and one mol of cocoanut oil mixed fatty acids, prepared by heating the same at 150 degrees C. for from two to three hours, were mixed with 15.7 grams of acetyl chloride. The addition of the acetyl chloride to the condensation product was gradual and the temperature rose, during the addition, from about 28 degrees C. to 70 degrees C. The mass was heated for two hours on the water bath. The final reaction product foamed nicely, reduced the surface tension of water, and had a pH of about 3.05.

Example III 75 grams of a condensation product of two mols of diethanolamine and one mol of cocoanut oil mixed with fatty acids, prepared by heating the same at 150 degrees C. for two to three hours, were mixed with 3.8 grams of chlor acetyl chloride, the latter being added a few drops at a time. The temperature rose during the addition from 35 degrees C. to 48 degrees C. After the addition was completed, the mass was maintained on a water bath for two and one-half hours. The final reaction product was a reddish, viscous mass, possessed good emulsifying and surface tension reducing properties and had a pH of about 6.05.

Example IV 90 grams of a condensation product of two mols of diethanolamine and one mol of stearic acid, prepared by heating the same between 150 degrees C. and 200 degrees C. for from two to three hours, were mixed with 15.7 grams of acetyl chloride, the latter being added gradually so as to prevent the temperature from rising too rapidly. After all of the acetyl chloride had been added, the mass was maintained on a water bath for two hours. The final product dispersed in hot water to form a cloudy solution. The pH of the reaction product was 4.1.

Example V 54 grams of a condensation product of one mol of diethanolamine and one mol of cocoanut oil mixed fatty acids, prepared by heating the mixture for three hours at about 160 degrees C., were reacted with 25 grams of chloracetyl chloride, the latter being added gradually over a period of 20 minutes. The reaction mass was then heated on a boiling water-bath for two hours. The resulting product had an acid reaction and possessed good technical properties.

Example VI 74 grams of a condensation product of one mol of oleic acid and one mol of triethanolamine, prepared by heating the mixture for three hours at 160 degrees C.–175 degrees C., were reacted with 18 grams of chloracetyl chloride, the latter being added gradually over a period of 20 minutes. The reaction mass was then heated on a boiling water bath for two hours. The resulting product had an acid reaction and possessed good technical properties.

I have not definitely ascertained the exact structure of all of the compounds which I produce herein and, accordingly, prefer to claim them as reaction products. The halogeno-carboxylic acids or their corresponding halides, however, unite with the condensation products, within the limitations set out hereinabove, with the splitting out of either water or a halogen acid. It will be appreciated that, in most cases, my novel compounds represent mixtures of different products, this being particularly the case where, for example, commercial sources of raw materials are employed such as commercial triethanolamine, commercial fatty acids, and the like. It will be understood that the amount of halogeno-carboxylic acid or corresponding halide thereof may be varied with the result that the compounds produced will likewise vary somewhat in their specific properties.

The temperature at which the condensation products are reacted with the halogeno-carboxylic acids or their corresponding halides will likewise vary within relatively wide ranges, this being dependent, obviously, upon the reactivity of the particular condensation product employed with the particular halogeno-carboxylic acid or derivative thereof, upon the speed of reaction desired, and upon other factors obvious to the skilled chemist. In general, temperatures of 90 degrees C. to 150 degrees C. will serve satisfactorily although the temperatures may be somewhat above or below this range.

The products of my present invention find use in connection with the preparation of emulsions of oleaginous and aqueous materials including the preparation of cosmetic emulsions such as face creams, cold creams, anti-perspiration creams, vanishing creams, brushless shaving creams, and the like. They are also of marked utility in ore separation processes, as disclosed in my copending application, Serial No. 150,757, filed June 28, 1937, now Patent No. 2,173,909, issued September 26, 1939, particularly for the separation of silica by flotation or the like. Other uses of the compounds are in connection with the treatment of paper; in the dehairing of hides and fat-liquoring and other treatments of leather; in the treatment of furs, cotton, wool, artificial fibres and similar materials in the textile industry. For example, said materials may be employed for the softening of fibres such as synthetic fibres or cellulose fibres as, for example, lustrous and delustered cellulose esters or cellulose ethers including cellulose acetate, cellulose propionate, as well as regenerated cellulose or rayon and the like, prior to or after dyeing. In general, the compounds may be employed in aqueous solutions containing quite small proportions, for example, 0.001% to 0.01% or even more or less, and the cellulose fibres may be contacted therewith in any suitable form such as filaments, threads, yarns, skeins or fabrics. In the textile industry, they may be employed, apart from the uses disclosed above, for such diverse purposes as assistants in dyeing operations, to insure even, level shades, and as dispersing agents for insoluble organic dyes and inorganic pigments, in baths for carbonizing wool, for aiding in discharging colors and stains from fabrics, in fulling baths, in the lustering, delustering, and weighting of fabrics, in sizes, and the like. Again in the treatment of paper, the compounds have utility as softening agents and may be employed in the digester. The compounds function also to improve the action of fungicidal, parasiticidal, insecticidal and antiseptic and disinfectant preparations where they serve, among other things, as spreading agents. Other uses are in floor polish emulsions where an aqueous vehicle is emulsified with waxes or the like. The compounds also possess utility in the preparation of printing pastes and in paints, lacquers and similar coating compositions. It will, of course, be appreciated that the uses mentioned above are only illustrative and that the compounds may be effectively employed for other purposes which will be understood by those skilled in the art in the light of the detailed description of my invention.

It will be seen, in the light of the description of my invention as set forth hereinabove, that at least most of the novel reaction products of my invention may be considered to fall into two sub-classes: (1) those which are derivatives of condensation products of alcohol amines and higher organic acids wherein the molal ratio of the alcohol amine to the higher organic acid is one to one, less than one to one, or not substantially greater than one to one, and (2) those which are derivatives of condensation products of alcohol amines and higher organic acids wherein the molal ratio of the alcohol amine to the higher organic acid is at least two to one or not substantially less than two to one. While both sub-classes fall within the scope of my invention, the reaction products of the second sub-class are especially satisfactory for most of the uses to which the products may be placed and, therefore, I regard said sub-class as constituting a particularly important phase of my invention.

I employ the term "condensation product" herein, as well as in my issued patents referred to above, to mean a reaction product between the reacting constituents, for example, alkylolamine and acid, wherein water or acid or the like is split out as a result of the union of the molecules of said reacting constituents. Similarly, the term "condensed" means a reaction involving the splitting out of water or acid or the like from the reacting constituents.

The terms "carboxylic acid substance" or "fatty acid substance," as used herein, are intended to cover the free carboxylic acid or fatty acid, as the case may be, as well as any acylating derivative thereof such as esters, anhydrides or acyl halides thereof.

What I claim as new and desire to protect by Letters Patent of the United States is:

1. The method of preparing acid-reacting products from a condensation product of alkylolamine and carboxylic acid substance containing at least six carbon atoms, said condensation product normally having an alkaline reaction in aqueous media, which comprises condensing therewith an organic compound which unites with said condensation product to produce an acid-reacting product, said organic compound being a halogeno-acyl halide containing not more than six carbon atoms.

2. The method of preparing acid-reacting products from a condensation product of an alkylolamine and a fatty acid substance containing at least six carbon atoms, said condensation product normally having an alkaline reaction in aqueous media, which comprises condensing therewith an aliphatic halogeno acyl halide containing not more than six carbon atoms.

3. The method of claim 2 wherein the halogeno acyl halide is chloracetyl chloride.

4. The method of preparing acid-reacting products from a condensation product of alcohol amine and carboxylic acid substance containing at least six carbon atoms, the molal ratio of the alcohol amine to the carboxylic acid present in said condensation product being not substantially less than two mols of alcohol amine for each carboxyl group present in said acid, said condensation product normally having an alkaline reaction in aqueous media, which comprises condensing therewith an organic compound which unites with said condensation product to produce an acid-reacting product, said organic compound being selected from the group consisting of halogeno-carboxylic acids and halogeno-acyl halides containing not more than six carbon atoms.

5. The method of claim 4 wherein the organic compound which unites with said condensation product is chlor-acetyl chloride.

6. The method of claim 4 wherein the alcohol amine is an hydroxy-ethyl amine and wherein the carboxylic acid substance is a member selected from the group consisting of fatty acids containing from twelve to eighteen carbon atoms, their esters, anhydrides and halides.

7. Acid-reacting condensation products in the form of the reaction product of a compound selected from the group consisting of halogeno-carboxylic acids and halogeno-acyl halides containing not more than six carbon atoms, with a condensation product of alcohol amine and carboxylic acid substance containing at least six carbon atoms, the molal ratio of the alcohol amine to the latter carboxylic acid present in said condensation product being not substantially less than two mols of alcohol amine for each carboxyl group present in said carboxylic acid substance.

8. Acid-reacting condensation products in the form of the reaction product of a compound selected from the group consisting of halogeno-carboxylic acids and halogeno-acyl halides containing not more than six carbon atoms, with a condensation product of alkylolamine and fatty acid substance containing from twelve to eighteen carbon atoms, the molal ratio of the alkylolamine to the fatty acid present in said condensation product being not substantially less than two mols of alkylolamine for each carboxyl group present in said fatty acid substance.

9. Products in accordance with claim 8 wherein the alkylolamine is an hydroxy-ethyl amine and the halogeno acyl halide is chlor-acetyl chloride.

10. Acid-reacting condensation products in the form of the reaction product of chlor-acetyl chloride with a condensation product of alkylolamine and fatty acid, said fatty acid containing from twelve to eighteen carbon atoms, the molal ratio of the alkylolamine to the fatty acid present in said condensation product being not substantially less than two to one.

11. Products in accordance with claim 10 wherein the alkylolamine is a member selected from the group consisting of monoethanolamine, diethanolamine, triethanolamine, and mixtures thereof.

12. Acid-reacting condensation products in the form of the reaction product of a compound selected from the group consisting of halogeno-carboxylic acids and halogeno-acyl halides containing not more than six carbon atoms, with a condensation product of alkylolamine and a member of the group consisting of carboxylic acids containing at least twelve carbon atoms, their esters, anhydrides, and halides, there being present in said condensation product not substantially less than two mols of alkylolamine for each carboxyl group present in said latter carboxylic acid.

13. Products in accordance with claim 12 wherein the carboxylic acid containing at least twelve carbon atoms is a fatty acid.

14. Products in accordance with claim 12 wherein the carboxylic acid containing at least twelve carbon atoms is a fatty acid and the halogeno-acyl halide is chlor-acetyl chloride.

15. Acid-reacting condensation products in the form of the reaction product of a compound selected from the group consisting of halogeno-carboxylic acids and halogeno-acyl halides containing not more than six carbon atoms, with a condensation product of at least one mol of alkylolamine, at least one mol of amine, and a member of the group consisting of carboxylic acids containing at least six carbon atoms, their esters, halides, amides, and anhydrides, approximately one mol of carboxylic acid containing at least six carbon atoms being present in said condensation product.

16. Products in accordance with claim 15 wherein the last-mentioned carboxylic acid is a fatty acid containing from twelve to eighteen carbon atoms.

17. Acid-reacting condensation products in the form of the reaction product of a halogeno-acyl halide containing not more than six carbon atoms, with a condensation product of alkylolamine and carboxylic acid substance containing at least six carbon atoms.

18. Acid-reacting condensation products in the form of the reaction product of a halogeno-acyl halide containing not less than six carbon atoms, with a condensation product of an alkylolamine and a fatty acid substance containing from 12 to 18 carbon atoms.

WOLF KRITCHEVSKY.